United States Patent
Better et al.

(10) Patent No.: US 11,233,616 B2
(45) Date of Patent: *Jan. 25, 2022

(54) NETWORK NODE AND METHOD IN A WIRELESS TELECOMMUNICATIONS NETWORK

(71) Applicant: Telefonaktiebolaget LM Ericsson (publ), Stockholm (SE)

(72) Inventors: David Better, Täby (SE); Tomas Lagerqvist, Stockholm (SE); Peter Nordlund, Spånga (SE); Anthony Paravati, Vällingby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/571,744

(22) Filed: Sep. 16, 2019

(65) Prior Publication Data

US 2020/0014502 A1 Jan. 9, 2020

Related U.S. Application Data

(63) Continuation of application No. 15/518,287, filed as application No. PCT/EP2015/065435 on Jul. 7, 2015, now Pat. No. 10,447,446.

(Continued)

(51) Int. Cl.
*H04L 29/12* (2006.01)
*H04W 72/12* (2009.01)
(Continued)

(52) U.S. Cl.
CPC ............ *H04L 5/005* (2013.01); *H04L 5/0073* (2013.01); *H04W 76/28* (2018.02); *H04L 5/0007* (2013.01);
(Continued)

(58) Field of Classification Search
CPC ... H04L 5/005; H04L 5/0073; H04L 61/6054; H04L 5/0007; H04W 76/28; H04W 72/121
See application file for complete search history.

(56) References Cited

U.S. PATENT DOCUMENTS

| 8,787,194 B2 | 7/2014 | Yang et al. |
| 2008/0090573 A1 | 4/2008 | Kim et al. |

(Continued)

FOREIGN PATENT DOCUMENTS

| WO | 2013138814 A1 | 9/2013 |
| WO | 2014171683 A1 | 10/2014 |
| WO | 2016032381 A1 | 3/2016 |

OTHER PUBLICATIONS

3rd Generation Partnership Project, "Technical Specification Group Radio Access Network; Evolved Universal Terrestrial Radio Access (E-UTRA); Medium Access Control (MAC) protocol specification (Release 9)", 3GPP TS 36.321 V9.6.0, Mar. 2012, pp. 1-48.

*Primary Examiner* — Un C Cho
*Assistant Examiner* — Lalita W Pace
(74) *Attorney, Agent, or Firm* — Coats & Bennett, PLLC

(57) ABSTRACT

A method performed by a network node for managing transmission of one or more CRS subframes. The network node identifies if a cell is actively serving a set of UEs. When the cell is actively serving a set of UEs, which set of UEs is configured for DRX the network node sends CRS over the first bandwidth in one or more CRS subframes which are transmitted in the cell during an onDuration interval of the DRX pattern and/or in one or more CRS subframes where system information is sent and/or in one or more CRS subframes where downlink, DL, data is sent. The network node sends CRS over a second bandwidth, in CRS subframes which are not transmitted in the cell during the onDuration interval of the DRX and/or in the one or more (Continued)

CRS subframes except CRS subframes where system information is sent and/or in the one or more CRS subframes except CRS subframes where DL data is sent, which second bandwidth is reduced in relation to the first bandwidth.

13 Claims, 6 Drawing Sheets

Related U.S. Application Data

(60) Provisional application No. 62/076,535, filed on Nov. 7, 2014, provisional application No. 62/108,667, filed on Jan. 28, 2015.

(51) Int. Cl.
*H04L 5/00* (2006.01)
*H04W 76/28* (2018.01)

(52) U.S. Cl.
CPC ....... *H04L 61/6054* (2013.01); *H04W 72/121* (2013.01)

(56) References Cited

U.S. PATENT DOCUMENTS

| | | |
|---|---|---|
| 2009/0196197 A1 | 8/2009 | DiGirolamo et al. |
| 2011/0164513 A1 | 7/2011 | Lecki et al. |
| 2013/0065612 A1* | 3/2013 | Siomina ................ H04W 24/02 455/456.2 |
| 2013/0194941 A1 | 8/2013 | Lu et al. |
| 2013/0201884 A1 | 8/2013 | Freda et al. |
| 2013/0250923 A1 | 9/2013 | Koorapaty et al. |
| 2013/0259009 A1 | 10/2013 | Berggren et al. |
| 2013/0286928 A1 | 10/2013 | Xu et al. |
| 2014/0016536 A1 | 1/2014 | Zhu |
| 2014/0036812 A1 | 2/2014 | Malladi et al. |
| 2014/0071957 A1 | 3/2014 | Xu et al. |
| 2014/0086173 A1 | 3/2014 | Sadeghi et al. |
| 2014/0153448 A1* | 6/2014 | Ribeiro ..................... H04L 5/14 370/280 |
| 2014/0204825 A1 | 7/2014 | Ekpenyong et al. |
| 2014/0254537 A1* | 9/2014 | Kim ....................... H04L 5/0053 370/329 |
| 2015/0055574 A1 | 2/2015 | Kim et al. |
| 2015/0146622 A1* | 5/2015 | Ren ........................ H04W 8/22 370/328 |
| 2015/0189613 A1* | 7/2015 | Chen ................ H04W 52/0212 370/311 |
| 2015/0327324 A1* | 11/2015 | Wei ....................... H04W 76/28 370/280 |
| 2015/0327325 A1 | 11/2015 | Koivisto et al. |
| 2016/0029250 A1 | 1/2016 | Yi et al. |
| 2016/0174014 A1 | 6/2016 | You et al. |

* cited by examiner

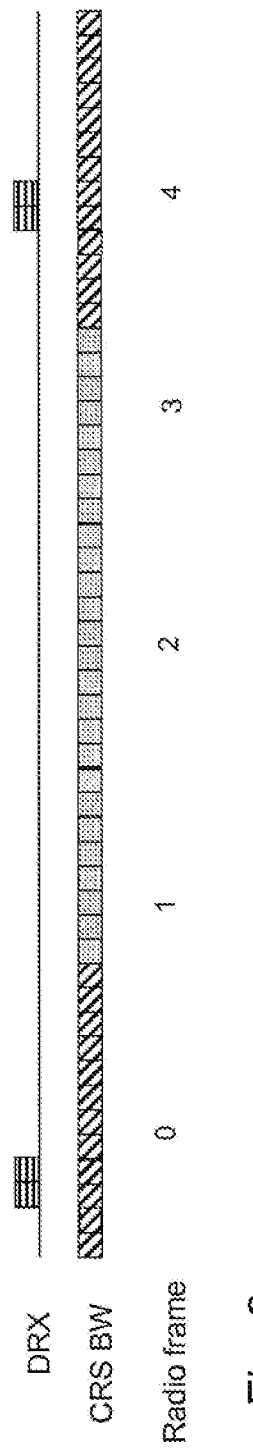
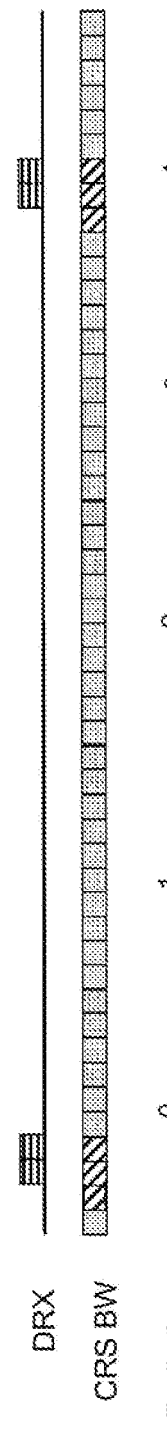
Fig. 6a
Fig. 6b

NETWORK NODE AND METHOD IN A WIRELESS TELECOMMUNICATIONS NETWORK

RELATED APPLICATIONS

This application is a continuation application of pending U.S. application Ser. No. 15/518,287, filed 11 Apr. 2017, which was the National Stage of International Application PCT/EP2015/065435, filed 7 Jul. 2015, which claims the benefit of U.S. Provisional Application No. 62/108,667, filed 28 Jan. 2015 and U.S. Provisional Application No. 62/076,535, filed 7 Nov. 2014, the entire disclosures of each being hereby incorporated by reference herein.

TECHNICAL FIELD

Embodiments herein relate to a network node and a method therein. In particular, a method and a network node for managing transmission of Cell Reference Signals are disclosed.

BACKGROUND

Communication devices such as User Equipments (UEs) are enabled to communicate wirelessly in a cellular communications network or wireless communication system, sometimes also referred to as a cellular radio system or cellular networks. The communication may be performed e.g. between two UEs, between a UE and a regular telephone and/or between a UE and a server via a Radio Access Network (RAN) and possibly one or more core networks, comprised within the cellular communications network.

UEs may further be referred to as wireless terminals, mobile terminals and/or mobile stations, mobile telephones, cellular telephones, laptops, tablet computers or surf plates with wireless capability, just to mention some further examples. The UEs in the present context may be, for example, portable, pocket-storable, hand-held, computer-comprised, or vehicle-mounted mobile devices, enabled to communicate voice and/or data, via the RAN, with another entity, such as another wireless terminal or a server.

The cellular communications network covers a geographical area which is divided into cell areas, wherein each cell area being served by a network node. A cell is the geographical area where radio coverage is provided by the network node.

The network node may further control several transmission points, e.g. having Radio Units (RRUs). A cell can thus comprise one or more network nodes each controlling one or more transmission/reception points. A transmission point, also referred to as a transmission/reception point, is an entity that transmits and/or receives radio signals. The entity has a position in space, e.g. an antenna. A network node is an entity that controls one or more transmission points. The network node may e.g. be a base station such as a Radio Base Station (RBS), eNB, eNodeB, NodeB, B node, or Base Transceiver Station (BTS), depending on the technology and terminology used. The base stations may be of different classes such as e.g. macro eNodeB, home eNodeB or pico base station, based on transmission power and thereby also cell size.

Further, each network node may support one or several communication technologies. The network nodes communicate over the air interface operating on radio frequencies with the UEs within range of the network node. In the context of this disclosure, the expression Downlink (DL) is used for the transmission path from the base station to the mobile station. The expression Uplink (UL) is used for the transmission path in the opposite direction i.e. from the UE to the base station.

In 3rd Generation Partnership Project (3GPP) Long Term Evolution (LTE), base stations, which may be referred to as eNodeBs or even eNBs, may be directly connected to one or more core networks. In LTE the cellular communication network is also referred to as Evolved Universal Terrestrial Radio Access Network (E-UTRAN).

An E-UTRAN cell is defined by certain signals which are broadcasted from the eNB. These signals contain information about the cell which can be used by UEs in order to connect to the network through the cell. The signals comprise reference and synchronization signals which the UE uses to find frame timing and physical cell identification as well as system information which comprises parameters relevant for the whole cell.

A UE needing to connect to the network must thus first detect a suitable cell, as defined in 3GPP TS 36.304 v11.5.0. The UE can be in either idle state, which is also referred to as IDLE or Radio Resource Control Idle (RRC_IDLE), or in connected state, which state is also referred to as CONNECTED or Radio Resource Control Connected (RRC_CONNECTED).

When the UE is in RRC_IDLE, it monitors a paging channel, which paging channel is part of a Paging Control Channel (PCCH) at a logical level, a Paging Channel (PCH) on a transport channel level and a Physical Downlink Shared Channel (PDSCH) on a physical channel level. While doing so the UE typically also performs a number of radio measurements which the UE uses to evaluate the best cell, such as Reference Signal Receive Power (RSRP), Reference Symbol Received Quality (RSRQ) or Received Signal Strength Indicator (RSSI). This is performed by measuring on received reference signals and/or parts of a spectrum which comprises reference signals sent by cells. This may also be referred to as "listening" for a suitable cell.

A suitable cell is commonly a cell which has RSRQ or RSRP above a certain level. The cell with the highest RSRP or RSRQ may be referred to as the best cell or the best suitable cell. Listening for a suitable cell may comprise searching for reference signals transmitted from the network node in an Orthogonal Frequency-Division Multiplexing (OFDM) subframe. When the best suitable cell is found the UE performs random access, according to a system information for the cell. This is done in order to transmit a Radio Resource Control (RRC) connection setup request to the network node. Assuming the random access procedure succeeds and the network node receives the request, the network node will either answer with an RRC connection setup message, which acknowledges the UE's request and tells it to move into RRC_CONNECTED state, or an RRC Connection reject, which tells the UE that it may not connect to the cell. In RRC_CONNECTED state the parameters necessary for communication between the network node and the UE are known to both entities and a data transfer between the two entities is enabled.

When the UE is in RRC_CONNECTED state the UE continues to measure RSRP, as an input to connected mode mobility decisions, such as e.g. deciding when to perform a handover from one cell to another. These measurements are typically performed in the full bandwidth of the subframe, which may also be referred to as the full spectrum.

RSRP is a measurement of the signal strength of an LTE cell which helps the UE to rank the different cells according to their signal strength as input for handover and cell reselection decisions. The RSRP is an average of a power of all resource elements which carry Cell-specific Reference Signals (CRS) over the entire bandwidth. The RSRP is therefore only measured in OFDM symbols carrying CRS.

An RRC protocol handles the control plane signaling of a network layer, which is also referred to as Layer 3, between the UE and the network node, which network node may also be referred to as an UTRAN or E-UTRAN node. There can only be one RRC Connection open between the UE and the network node at any one time.

The network layer may further comprise:
Functions for connection establishment and release,
Broadcast of system information,
Radio bearer establishment/reconfiguration and release,
RRC connection mobility procedures,
Paging notification and release,
Outer loop power control.

In order to support the UE in connecting to a cell, which may also be referred to as accessing a cell, System Information Blocks (SIBs) are transmitted in a control channel, such as e.g. a Broadcast Control Channel (BCCH) logical channel in the downlink, which may be mapped to the PDSCH physical channel. In LTE a number of different SIBs are defined, which are characterized by the information they are carrying. For example, cell access related parameters, such as information about the operator of the cell, restrictions to what users may access the cell and the allocation of subframes to uplink/downlink are carried by SIB1. SIB1 further carries information about scheduling of other SIBs.

In order to reduce power consumption of the UE, Discontinuous Reception (DRX) may be implemented. The basic mechanism in DRX is a configurable DRX cycle, which may also be referred to as a DRX pattern, in the UE. With a DRX cycle configured, the UE only monitors the control signaling during an onDuration interval of the DRX cycle. The onDuration interval may be one or more subframes, which may be referred to as an active subframe or active subframes. In the remaining subframes of the DRX cycle, the UE may switch off its receiver, which may also be referred to as the UE sleeping or as an offDuration interval of the DRX cycle. This allows for a significant reduction in power consumption, i.e. the longer the DRX cycle and the shorter the onDuration interval, the lower the power consumption will be. In some situations, if the UE has been scheduled and active with receiving or transmitting data in one subframe, it is likely that it will be scheduled again in the near future. Waiting until the next active subframe according to the DRX cycle may lead to additional delays in transmission. Hence, to reduce delays, the UE may remain in the active state for a certain configurable time after being scheduled, this may also be referred to as the active time or the DRX-InactivityTimer, as defined in 3GPP TS36.321 Ch3.1. The duration of the active time is set by an inactivity timer, which is the duration in downlink subframes that the UE waits before it switches off and re-enters offDuration from the last successful decoding of a Physical Downlink Control Channel (PDCCH). The UE may restart the inactivity timer after a single successful decoding of a PDCCH for a transmission. The time it takes for the UE to re-enter offDuration after the last transmission may also be referred to as the inactivity time.

To facilitate handover to other cells, each network node may store cell identities of cells that are supported by other network nodes in an address database, in order to know how to contact the network node of potential target cells for handover. Each network node serving a cell typically stores in the database which cells it has neighbor relations to, i.e. which of the cells in the area UEs often perform handover to. The cell's neighbor relations will hereafter be referred to as the cell's "neighbor relation list".

CRS are UE known symbols that are inserted in a Resource Element (RE) of a subframe of an OFDM time and frequency grid and broadcasted by the network node. Each RE has an extension in the frequency domain corresponding to an OFDM sub carrier and an extension in the time-domain corresponding to an OFDM symbol interval.

The CRSs are used by the UE for downlink channel estimation. Channel estimation is used for demodulation of downlink data both when the UE is in an RRC_CONNECTED state and is receiving user data and when the UE is in an RRC_IDLE state and is reading system information. Due to the latter use case, the CRSs must be transmitted even from cells which do not have any UEs in RRC connected state since the network node cannot know whether a UE wants to access the network until it performs random access. Downlink CRSs are inserted within the first and third last OFDM symbol of each slot with a frequency domain spacing of six sub-carriers. A slot is a time period of the OFDM time and frequency grid, which is usually 0.5 msec long. A problem with the known technology is therefore that cells without any UEs in RRC connected state still consume power due to CRS broadcasting.

In case several antennas are used by the network node for transmitting and each antenna is representing a cell, each antenna has to transmit a unique reference signal in order for the UE to connect to that specific cell. When one antenna transmits, the other antennas have to be silent in order not to interfere with the first antennas reference signal. To reduce the interference of reference signals between the cells, the position of the CRS is usually shifted in frequency between the cells. The CRS can be shifted between 0-5 sub carriers, each sub carrier corresponding to a frequency shift of 15 kHz for LTE. The frequency shift can be derived from the physical Cell Identity (Cell ID) which is signaled to the UE by selection of appropriate Primary Synchronization Channel (PSCH) and Secondary Synchronization Channel (SSCH).

Although this reduces the interference of reference symbols, such as CRS symbols, between cells, it has the problem that the reference symbols of one cell will disturb PDSCH and PDCCH symbols of neighboring cells.

Hence, even though cells do not have any UEs in RRC_CONNECTED state, disturbance may impact UE DL throughput in neighboring cells. This will especially be the case when the UE is in and/or close to borders between cells.

Reducing the power of the CRS may mitigate this problem. However, in order to access a cell the UE must be able to hear the CRS of the cell, i.e. the UE must be able to recognize and receive the CRS transmitted from the cell. Therefore reducing the power of the CRS also shrinks the size of the cell, since more distant UEs no longer will hear the CRS sent by the cell. Furthermore, the quality of the channel estimates used for demodulation decreases when the Signal to Interference Ratio (SINR) on the CRS decreases. Reducing the power of the CRS therefore causes degradation of cell edge performance. This degradation is further aggravated when the load in the network increases, especially if the data is transmitted with higher power than the CRS, which is usually the case when the effect of CRS interference is to be reduced, thus, leading to a reduced performance of the wireless communication network.

SUMMARY

It is therefore an object of embodiments herein to enhance the performance in a wireless communications network.

According to a first aspect of embodiments herein, the object is achieved by a method, performed by a network node, for managing transmission of Cell Reference Signals, CRS.

The network node operates one or more cells. The network node identifies if a cell is actively serving a set of UEs or not. When the cell is not actively serving any UEs, the network node sends CRS over a first bandwidth in one or more CRS subframes which are transmitted during a paging occasion and/or in one or more CRS subframes where system information is sent. The network node further sends CRS over a second bandwidth in one or more CRS subframes which are not transmitted during a paging occasion and/or in one or more CRS subframes except subframes where system information is sent. The second bandwidth is reduced in relation to the first bandwidth. When the cell is actively serving a set of UEs, which set of UEs is configured for Discontinous Reception, DRX, the network node sends CRS over the first bandwidth in one or more CRS subframes which are transmitted in the cell during an onDuration interval of the DRX pattern and/or in the one or more CRS subframes where system information is sent and/or in one or more CRS subframes where downlink, DL, data is sent. The network node further sends CRS over the second bandwidth, in CRS subframes which are not transmitted in the cell during the onDuration interval of the DRX and/or in the one or more CRS subframes except CRS subframes where system information is sent and/or in the one or more CRS subframes except CRS subframes where downlink, DL, data is sent. The second bandwidth is reduced in relation to the first bandwidth.

According to a second aspect of embodiments herein, the object is achieved by a network node configured to manage transmission of Cell Reference Signals, CRS. The network node operates one or more cells. The network node is configured to identify if a cell is actively serving a set of UEs or not. When the cell is not actively serving any UEs, the network node is configured to send CRS over a first bandwidth in one or more CRS subframes which are transmitted during a paging occasion and/or on CRS subframes where system information is sent. The network node is further configured to send CRS over a second bandwidth in one or more CRS subframes which are not transmitted during a paging occasion and/or in CRS subframes except CRS subframes where system information is sent. The second bandwidth is reduced in relation to the first bandwidth. When the cell is actively serving a set of UEs, which set of UEs is configured for Discontinous Reception, DRX, the network node is further configured to send CRS over the first bandwidth in one or more CRS subframes which are transmitted in the cell during an onDuration interval of a DRX pattern and/or in CRS subframes system information is sent and/or in CRS subframes where downlink, DL, data is sent. The network node is further configured to send CRS over the second bandwidth, in CRS subframes which are not transmitted in the cell during an onDuration interval of the DRX pattern and/or in CRS subframes except CRS subframes where system information is sent and/or on CRS subframes except CRS subframes where downlink, DL, data is sent. The second bandwidth is reduced in relation to the first bandwidth.

By applying a reduced bandwidth mode on CRS transmitted in all subframes, except subframes transmitted in the cell during or related to the onDuration or in or related to subframes in which system information, such as SIBs, is sent, the power consumption and the interference from the cells may be reduced, thereby enhancing the performance of neighboring cells where data is transmitted. In other words, the reduced bandwidth mode is applied during phases when no data transfer occurs and the UE turns its receiver off and enters a low power mode.

By applying a reduced bandwidth mode on CRS in cells that do not serve any UEs in RRC connected mode, the power consumption and the interference from empty cells can be reduced, thereby enhancing the performance of cells that have UEs in RRC connected mode.

BRIEF DESCRIPTION OF THE DRAWINGS

Examples of embodiments herein are described in more detail with reference to attached drawings in which:

FIG. 6a is a scheduling diagram illustrating a first embodiment of the method herein.

FIG. 6b is a scheduling diagram illustrating a first embodiment of the method herein.

DETAILED DESCRIPTION

Terminologies

Figure 1:
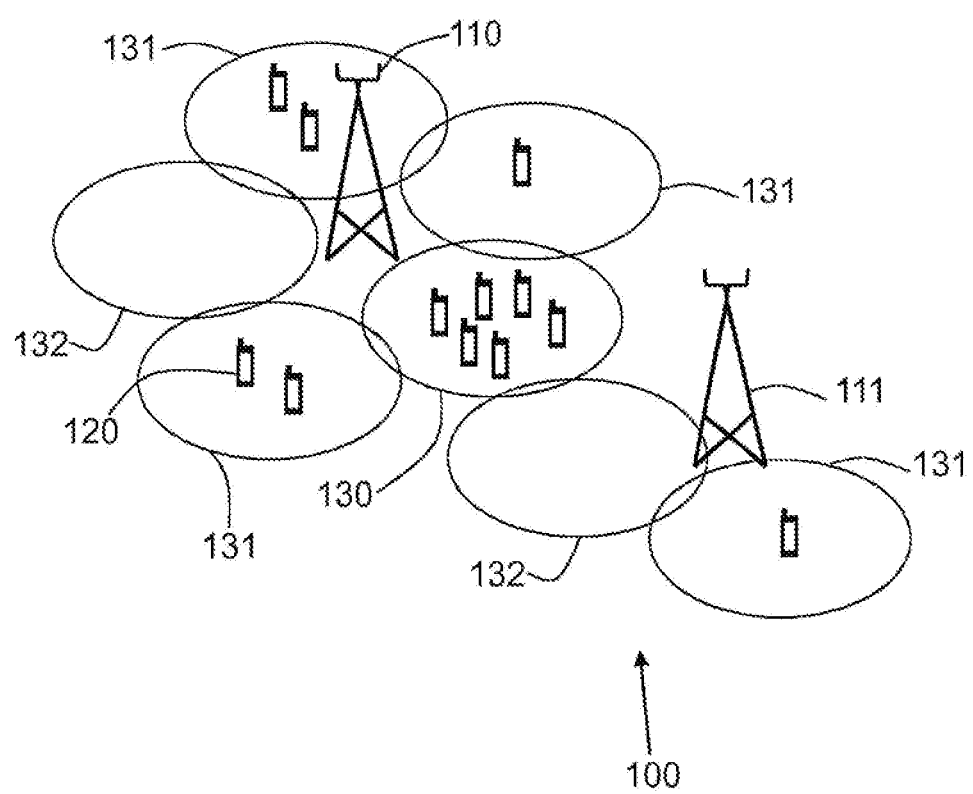
FIG. 1 is a schematic block diagram illustrating embodiments of a wireless communications network.

The following common terminologies are used in the embodiments and are elaborated below:

Radio network node: In some embodiments the non-limiting term radio network node is more commonly used and it refers to any type of network node serving UE and/or connected to other network node or network element or any radio node from where UE receives signal. Examples of radio network nodes are Node B, base station (BS), multi-standard radio (MSR) radio node such as MSR BS, eNode B, network controller, radio network controller (RNC), base station controller, relay, donor node controlling relay, base transceiver station (BTS), access point (AP), transmission points, transmission nodes, RRU, RRH, nodes in distributed antenna system (DAS) etc.

Network node: In some embodiments a more general term "network node" is used and it can correspond to any type of radio network node or any network node, which communicates with at least a radio network node. Examples of network node are any radio network node stated above, core network node (e.g. a Mobile Switching Centre (MSC), a Mobility Management Entity (MME) etc.), an Operations & Maintenance (O&M) centre, an Operations Support System (OSS), a Self-Organizing Network (SON), a positioning node (e.g. an Evolved Serving Mobile Location Center (E-SMLC)), a Master Data Telegram (MDT), etc.

User equipment: In some embodiments the non-limiting term user equipment (UE) is used and it refers to any type of wireless device communicating with a radio network node in a cellular or mobile communication system. Examples of UE are target device, device to device UE, machine type UE or UE capable of machine to machine communication, PDA, iPAD, Tablet, mobile terminals, smart phone, laptop embedded equipped (LEE), laptop mounted equipment (LME), USB dongles etc.

The embodiments herein also applies to the multi-point carrier aggregation systems.

Note that although terminology from 3GPP LTE has been used in this disclosure to exemplify the embodiments herein, this should not be seen as limiting the scope of the embodiments herein to only the aforementioned system. Other wireless systems, including WCDMA, WiMax, UMB and GSM, may also benefit from exploiting the ideas covered within this disclosure.

Also note that terminology such as eNodeB and UE should be considering non-limiting and does in particular not imply a certain hierarchical relation between the two; in general "eNodeB" could be considered as device 1 and "UE" device 2, and these two devices communicate with each other over some radio channel. Herein, we also focus on wireless transmissions in the downlink, but the embodiments herein are equally applicable in the uplink.

In this section, the embodiments herein will be illustrated in more detail by a number of exemplary embodiments. It should be noted that these embodiments are not mutually exclusive. Components from one embodiment may be tacitly assumed to be present in another embodiment and it will be obvious to a person skilled in the art how those components may be used in the other exemplary embodiments.

FIG. 1 depicts an example of a wireless communications network 100 according to a first scenario in which embodiments herein may be implemented. The wireless communications network 100 is a wireless communication network such as an LTE, E-UTRAN, WCDMA, GSM network, any 3GPP cellular network, Wimax, or any cellular network or system.

The wireless communications network 100 comprises a plurality of network nodes whereof two, a first network node 110 and a second network node 111 are depicted in FIG. 1. The first network node 110 and the second network node 111 are network nodes which each may be a transmission point such as a radio base station, for example an eNB, an eNodeB, or an Home Node B, an Home eNode B or any other network node capable to serve a wireless terminal such as a user equipment or a machine type communication device in a wireless communications network. The first network node 110 and the second network node 111 each serves a plurality of cells 130, 131, 132.

The wireless communications network 100 comprises a set of UEs 121, which set may comprise one or more UEs 120. The first network node 110 and the second network node 111 may each be a transmission point for the UE 120. The UE 120 is within radio range of the first network node 110 and the second network node 111, this means that it can hear signals from the first network node 110 and the second network node 111. There may also be one or more UEs 120 in each cell, the one or more UEs 120 may also be referred to as a set of UEs 121.

A UE 120 of the set of UEs 121 may e.g. be a wireless terminal, a wireless device, a mobile wireless terminal or a wireless terminal, a mobile phone, a computer such as e.g. a laptop, a Personal Digital Assistant (PDA) or a tablet computer, sometimes referred to as a surf plate, with wireless capability, or any other radio network units capable to communicate over a radio link in a wireless communications network. Please note the term wireless terminal used in this document also covers other wireless devices such as Machine to machine (M2M) devices.

Figure 2:
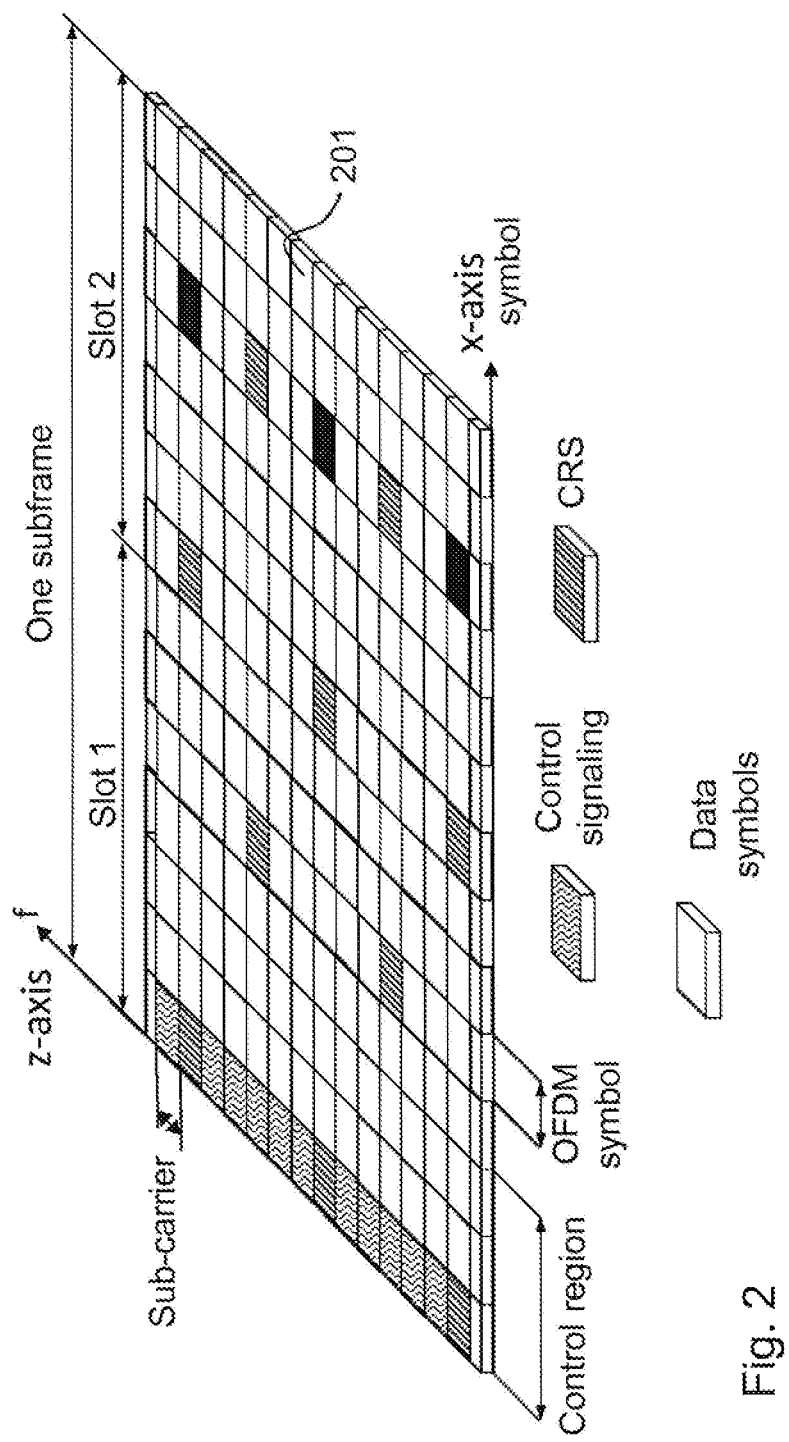
FIG. 2 is a schematic block diagram illustrating embodiments of an OFDM subframe.

FIG. 2 shows an exemplary downlink OFDM time and frequency grid, which may also be referred to as an OFDM subframe. Each subframe comprises two slots. Each slot comprising a number of resource elements (RE) 201 extending both in the time domain (x-axis) and in the frequency domain (z-axis). Each RE's 201 extension in the frequency domain may be referred to as a sub-carrier whereas the extension in the time domain may be referred to as an OFDM symbol. In the time domain, LTE downlink transmissions are organized into radio frames of 10 ms, wherein each radio frame comprises ten equally-sized subframes. Furthermore, the resource allocation in LTE may typically be described in terms of Physical Resource Blocks (PRBs), comprising a plurality of REs. A resource block corresponds to one slot in the time domain and 12 contiguous subcarriers in the frequency domain.

Downlink and uplink transmissions are dynamically scheduled, i.e. in each subframe the first network node 110 transmits control information about to or from which UE 120 data is transmitted and upon which resource blocks the data is transmitted. The control information may comprise system information, paging messages and/or random access response messages. The control information for a given UE 120 may be transmitted using one or multiple PDCCH. Control information of a PDCCH is transmitted in the control region of each subframe. FIG. 2 shows an exemplary size of a normal control region of three OFDM symbols allocated for control signaling, for example the PDCCH. The size of the control region may however be dynamically adjusted according to the current traffic situation. In the example shown in the figure only the first OFDM symbol out of the three possible is used for control signalling. Typically the control region may comprise a plurality of PDCCHs carrying control information to multiple UEs 120 simultaneously. The REs used for control signaling are indicated with wave-formed lines and REs used for CRS are indicated with diagonal lines.

The CRS are used by the UE 120 for downlink channel estimation. Channel estimation is used for determining the demodulation of downlink data both when the UE 120 is in RRC connected state and when the UE 120 is in RRC idle state and is reading system information. Downlink CRS may be inserted within a first and a third last OFDM symbol of each slot with a frequency domain spacing of six sub-carriers. RSRP is a measurement of the signal strength of an LTE cell which helps the UE 120 to rank between the different cells as input for handover and cell reselection decisions. The RSRP is the average of a power of all resource elements which carry Cell-specific Reference Signals (CRS) over the entire bandwidth. It is therefore only measured in OFDM symbols carrying CRS.

The subframe also comprises data symbols used for transmitting user data between the first network node 110 and the UE 120. The data symbols are situated in the region following the control region, which is also referred to as the data region.

Figure 3:
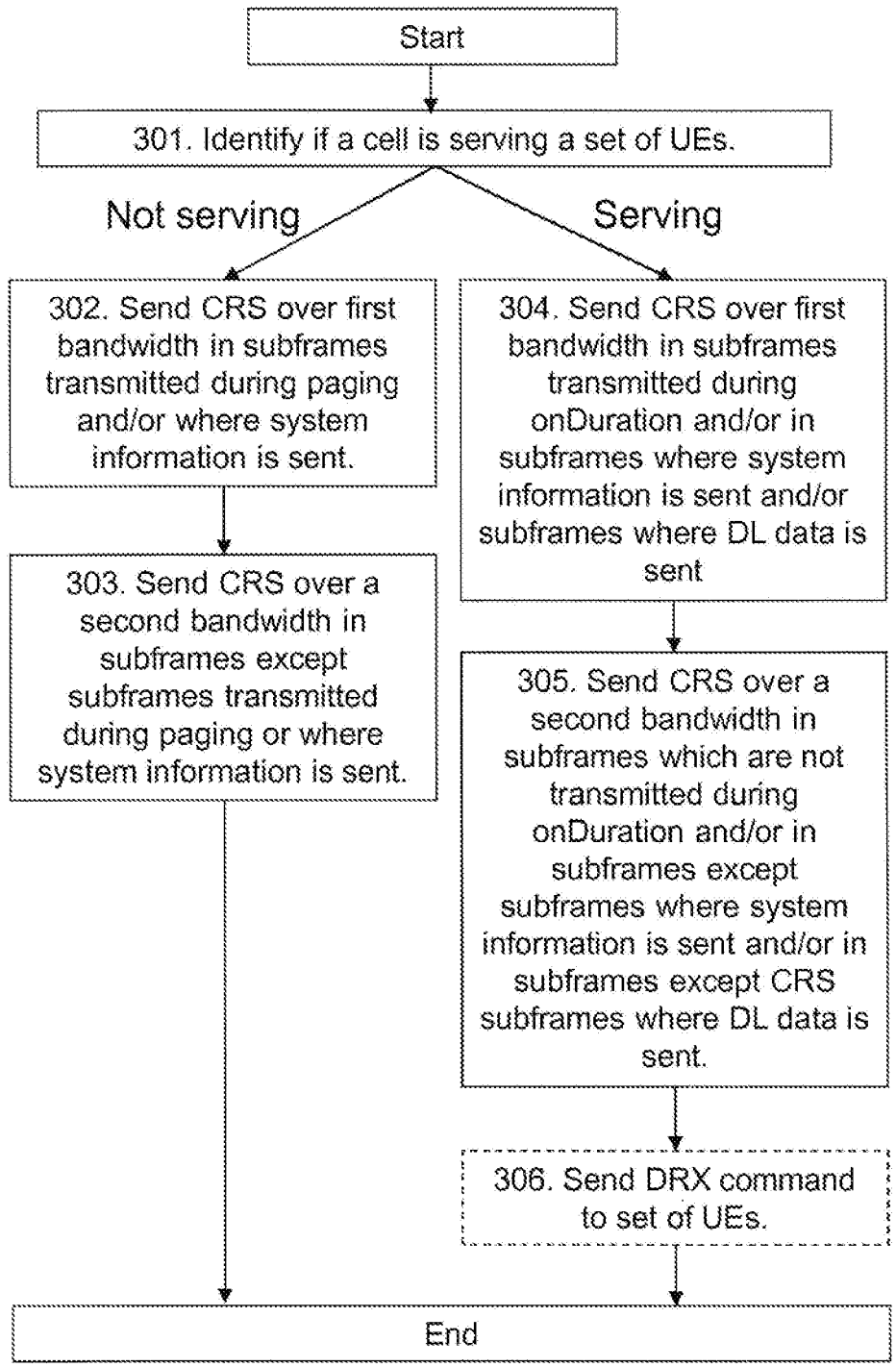
FIG. 3 is a flowchart depicting a first embodiment of a method in a network node.

A first example of embodiments of a method in the network node 110 for managing transmission of Cell Reference Signals, CRS, will now be described with reference to a flowchart depicted in FIG. 3. The network node 110 operates one or more cells 130, 131, 132, which cells may or may not serve a set of UEs 121.

The method may comprise the following actions, which actions may be taken in any suitable order. Dashed lines of a box in FIG. 3 indicate that this action is not mandatory.

Action 301

The network node 110 identifies if a cell out of the one or more cells 130, 131, 132 is actively serving a set of UEs 121 or not. A cell actively serving a set of UEs 121 may also be referred to as a cell having a set of connected UEs and a cell not actively serving a set of connected UEs 121 may be referred to as an empty cell. This action 301 may be performed by an identifying module 404 within a network node, such as the network node 110. This action corresponds to action 401 described below.

When the network node 110 has identified a cell which is not actively serving a set of UEs 121, the network node performs the actions 302 and 303 described below. Although the actions 302 and 303 are depicted as following each other, the actions may be performed simultaneously.

Action 302

When the network node 110 has identified a cell which is not actively serving a set of UEs 121, the network node 110 sends CRS over a first bandwidth in one or more CRS subframes which are transmitted during a paging occasion and/or on one or more CRS subframes where system information is sent. This Action 303

When the network node 110 has identified a cell which is not actively serving a set of UEs 121, the network node 110 further sends CRS over a second bandwidth in one or more CRS subframes which are not transmitted during a paging occasion and/or in one or more CRS subframes except subframes where system information is sent. The second bandwidth is reduced in relation to the first bandwidth.

In a further embodiment herein the paging occasion may only be sent in one CRS subframe of each radio frame which has paging, in the cell which is not serving a set of UEs 121. Thereby, the number of CRS subframes which have to be sent with the first bandwidth is reduced, which allows the network node 110 to reduce the bandwidth in a higher number of CRS subframes.

When the network node has identified a cell which is actively serving a set of UEs (121), which set of UEs (121) is configured for a Discontinous Reception, DRX, the network node 110 performs the actions 304 and 305 described below. Although the actions 304 and 305 are depicted as following each other, the actions may be performed simultaneously.

Action 304

When the network node has identified a cell which is actively serving a set of UEs (121), which set of UEs (121) is configured for a Discontinous Reception, DRX, the network node 110 sends CRS over the first bandwidth in one or more CRS subframes which are transmitted in the cell during an onDuration interval of the DRX pattern and/or in the one or more CRS subframes where system information is sent and/or on one or more CRS subframes where downlink, DL, data is sent, In a further embodiment, the network node 110 may also send CRS over the first bandwidth in CRS subframes transmitted directly preceding or following the CRS subframes transmitted during a paging occasion and/or the CRS subframes where system information is sent and/or during an onDuration interval and/or CRS subframes where DL data is sent.

Action 305

When the network node has identified a cell which is actively serving a set of UEs (121), which set of UEs (121) is configured for a Discontinous Reception, DRX, the network node 110 further sends CRS over the second bandwidth, in CRS subframes which are not transmitted in the cell during the onDuration interval of the DRX and/or in the one or more CRS subframes except CRS subframes where system information is sent and/or in the one or more CRS subframes except CRS subframes where DL data is sent. The second bandwidth is reduced in relation to the first bandwidth. This action 305 corresponds to action 402 described below, hence the embodiments described for action 402 may also apply for this action 305.

Action 306

When the network node 110 has identified a cell which is actively serving a set of UEs, the network node 110 may further send a message to the set of UEs 121 comprising a DRX command. The DRX command indicates the DRX pattern, which may also be referred to as the DRX cycle, for the set of UEs 121. The indicated DRX pattern is the DRX pattern that the set of UEs 121 shall use. The onDuration of the DRX pattern is aligned for the UEs 120 comprised in the set of UEs 121, such that the UEs 120 have an overlapping onDuration interval. By aligning the onDuration interval of the UEs 120, the UEs may be grouped, i.e. the UEs will have overlapping on Duration. This has the advantage that the occasions where the CRS are transmitted in the first bandwidth mode may be reduced and the number of subframes where CRS is sent over the second bandwidth is increased. This will further improve the performance of the cell.

This action 306 corresponds to action 403 described below, hence the embodiments described for action 403 may also apply for this action 306.

By sending the message comprising the command indicating the onDuration of the DRX pattern to all connected UEs in a cell, the UEs may be grouped together, i.e. the UEs are configured to have overlapping on Duration. In doing so the performance of the cell may further be increased, since the occasions where the CRS have to be transmitted with full bandwidth may be minimized, since each UE performs the radio measurement, such as RSRP, RSRQ or RSSI, during the same time interval.

Figure 4:
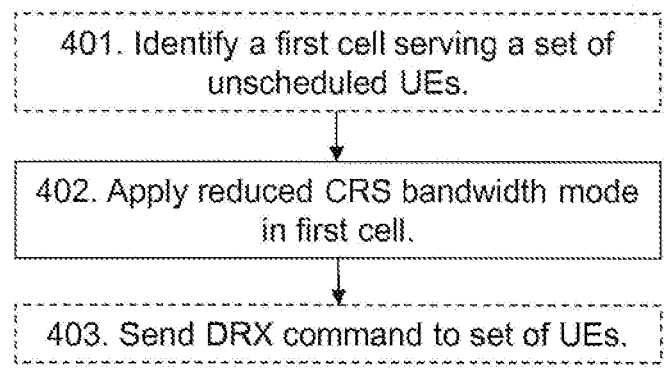
FIG. 4 is a flowchart depicting a second embodiment of a method in a network node.

A further example of embodiments of a method in the network node 110 for managing transmission of Cell Reference Signals, CRS, will now be described with reference to a flowchart depicted in FIG. 4. The network node 110 operates one or more cells and is configured to transmit the CRS in a first bandwidth mode during operation. This relates to normal operation. The first bandwidth mode may also be referred to as the normal bandwidth mode which is used when the at least one cell of the network node 110 is serving at least one UE 120 in RRC connected mode and the at least one UE 120 is scheduled to receive data. In the normal bandwidth mode CRS are transmitted over the entire available bandwidth of a DL Radio Frame (RF), i.e. CRS are transmitted in all Physical Resource Blocks (PRBs) of the cell.

The method may comprise the following actions, which actions may be taken in any suitable order. Dashed lines of a box in FIG. 4 indicate that this action is not mandatory.

Action 401

The network node 110 identifies a cell which serves a set of UEs 121, which may also be referred to as a set of connected UEs. The set of UEs 121 is configured for Discontinous Reception (DRX). The set of UEs 121 may comprise one or more UEs 120. The set of UEs 121 are unscheduled, by the network node, for receiving transmissions from the network node transmitted in one of its cells. This may mean that the network node has not scheduled the set of UEs 121 for reception of transmission sent from the network node 110 in the cell or that a certain time (T) has elapsed since the set of UEs 121 was scheduled for transmission in UL or DL. The time T may be the time set in the DRX inactivityTimer. This action 401 may be performed by an identifying module 404 within a network node, such as the network node 110.

Action 402

When the network node 110 has identified a first cell which serves a set of UEs 121, which set of UEs 121 are unscheduled by the network node 110, the network node 110 applies a second bandwidth mode, aka. reduced CRS bandwidth mode, on CRS in subframes which are not transmitted in the cell during an onDuration of the DRX or in subframes where system information is sent. In a further embodiment the reduced CRS bandwidth mode may also be applied on CRS sent in subframes which are not transmitted in relation to the onDuration or in relation to subframes where system information is sent, this may e.g. be a subframe directly preceding or following the onDuration or the subframe in which system information is sent. In the second bandwidth mode the bandwidth is reduced in relation to the first bandwidth mode. The system information may e.g. be System information Blocks (SIBs). This reduced bandwidth mode may also be referred to as low bandwidth mode. Low bandwidth mode means that the network node 110 is not transmitting CRS in all PRBs of the subframe of the cell. By reducing the bandwidth of the CRS, i.e. only transmitting CRS on a part of the available bandwidth of the DL radioframe, the overall interference of the CRS from the cell 130 is reduced. Reducing the interference from the cell 130 increases the throughput in neighboring cells 131 with RRC connected and scheduled UEs 120 is increased.

Studies have shown that when the CRS bandwidth is reduced, mobility measurements, which may also be referred to as cell evaluation or best cell evaluation, such as RSRP, may be negatively affected. This may lead the UE to make incorrect decisions about which cell it should camp on. When a UE 120 performs mobility measurements on the neighbor cell only a limited part of the bandwidth is taken into consideration. This limited part of the bandwidth may e.g. be the central six PRBs of the subframe. However, when the UE performs measurements on the cell it camps on, which may also be referred to as the own cell, the whole bandwidth is taken in consideration. If the bandwidth for sending CRS is reduced in the cell the CRS will only be sent in a part of the bandwidth, such as e.g. in the central six PRBs. However, the RSRP is computed as the average power of all REs which carry CRS over the entire bandwidth. Since the power of the CRS sent in e.g. the central six PRBs are the averaged over the entire bandwidth and not just over the reduced bandwidth, the RSRP of the own cell may seem lower than for the neighboring cell. This may lead to the UE connecting to, which may also be referred to performing handover to, a neighboring cell which in reality is worse, but may seem better. This may lead to the UE starting to perform multiple handovers, which may also be referred to as ping-pong, back and forth between cells, since the neighboring cell, which is only evaluated on the central six PRBs, will always seem better.

In order to prevent that the reduced bandwidth mode negatively affects, such as destroys, the mobility measurements, such as cell evaluation or best cell evaluation, subframes transmitted during the onDuration of the DRX or subframes where system information is sent are transmitted in the first, which may also be referred to as the normal, bandwidth mode.

In a further embodiment CRS may be transmitted in the normal bandwidth mode also in subframes around the subframe sent during the on Duration. In one embodiment the normal bandwidth mode may be applied on a plurality of subframes before or after the subframes sent during the on Duration. The number of subframes sent in the normal bandwidth mode may be up to twenty-five subframes including the subframes sent during the on Duration. The onDuration may be located over two subframes. In a further embodiment the normal bandwidth mode may be applied on the four subframes preceding the onDuration and on the seven subframes following the on Duration, such that the normal bandwidth mode is applied on a total of thirteen subframes. By transmitting CRS in the normal bandwidth mode in subframes located around the onDuration, it may be assured that legacy UEs, which are not performing measurements as accurately as modern UEs, are able to measure CRS in order to perform channel estimation, even though the measurement is not performed exactly during the onDuration. The number of subframes in which CRS is sent in the normal bandwidth mode may be reduced, depending on the accuracy of the measurements performed by the UEs. In a further embodiment the normal bandwidth mode may e.g. be applied for one subframe preceding the subframe sent during the onDuration or the subframe in which system information is sent. Thereby it may be assured that CRS are sent over the whole bandwidth, i.e. in the normal bandwidth mode when the UE is performing measurements during the on Duration. This embodiment is depicted in FIG. 6.

In yet another embodiment the CRS may be transmitted in the normal bandwidth mode also during the inactivity time of the UE.

It may further be beneficial to have a long DRX cycle, i.e. a long time between the onDurations of the DRX, since that enables the network node 110 to apply the reduced bandwidth mode on a higher number of subframes. In one embodiment herein, the DRX cycle, which may also be referred to the cycle of the DRX pattern, may be in the range of 20 ms to 320 ms. In a further embodiment herein, the DRX cycle may be in the range of 20 ms to 80 ms. In yet another embodiment the DRX cycle may be 40 ms long. Studies have shown that this is the preferred periodicity at which a UE typically reads RSRP in order to evaluate the channel conditions in the cell to which it is connected.

This action 402 may be performed by a bandwidth regulating module within a network node, such as the network node 110.

Action 403

In a further embodiment herein the network node 110 may send a message to the set of UEs 121, which message comprises a Discontinous Reception (DRX) command. The command indicates a DRX cycle wherein the onDuration, which may also be referred to as the onDuration interval, of the DRX pattern is aligned for the UEs comprised in the set of UEs 121. Thereby the UEs may be grouped, i.e. the UEs will have overlapping onDuration. This has the advantage that the occasions where the CRS are transmitted in the first bandwidth mode may be reduced. This will further improve the performance of the cell.

In yet another embodiment herein the onDuration of the DRX pattern may be aligned with a sending of one or more subframes comprising system information, such as a System Information Block (SIB). In a further embodiment herein, the onDuration is aligned with SIB 1. Since SIB1 comprises cell access related parameters, and information about scheduling of other SIBs, SIB 1 will be transmitted even if the remaining SIBs are not. Aligning the onDuration of the set of UEs 121 with the sending of SIB1, therefore further improves the performance of the cell, since the subframes sent in the first bandwidth mode may further be reduced. Aligning the onDuration with SIB1 further diminishes losses, since SIB1 is anyhow transmitting with full CRS bandwidth. SIB1 may be sent in subframe 5 with a periodicity of 20 ms, which may also be referred to as SFN mod 2=0. By enforcing DRX, the UEs may be triggered, which may also be referred to as being encouraged, ordered, forced or tricked, to always evaluate the state of the current cell when CRS are transmitted in full bandwidth mode and reduce the bandwidth when the UEs that are connected are sleeping. The trigger may be sent in the DRX command in which the onDuration of the DRX cycle is set. The DRX pattern may be applied to the UE 120 in order to trigger evaluation of RSRP and other measurements to timeslots where the network node already transmits CRS over the full bandwidth, i.e. in the normal bandwidth mode.

In yet another embodiment the network node 110 may force the UE to enter DRX sleep by sending a 3GPP DRX Command MacControlElement, such as for example the one defined in 3GPP TS 36.321 v11.5.0 Ch 6.1.3.3 and referred to as DRX Command MAC Control Element. The MacControl Element may comprise an indication to stop the DRX inactivity timer and/or an onDuration timer.

In further embodiments herein the alignment of the onDuration of the DRX patterns and/or the application of the reduced CRS bandwidth may be deactivated when the number of connected UEs in a cell exceeds a certain threshold.

This action 403 may be performed by a sending module within a network node, such as the network node 110. The sending module may also be comprised in a radio circuitry within a network node, such as the network node.

In one embodiment herein, the reduced CRS bandwidth mode is applied on CRS which are sent in any subframe, except in subframes where the network node 110 transmits system information, paging or random access response messages or subframes where the network node 110 assumes a UE 120 to perform measurements. By applying the reduced CRS bandwidth mode in all subframes except the ones mentioned above, the interference by the CRS is reduced while at the same time allowing UEs 120 in neighboring cells 131, 132 to hear the CRS from the empty cell 130. This is required in order for the UE 120 to get information about the modulation of the signal, in order to be able to demodulate the downlink control channel of the cell. In this embodiment the network node 110 may send CRS over the entire bandwidth in subframes in which the network node 110 transmits system information, such as SIBs, paging or random access response messages or assumes UE 120 to perform measurements.

In a further embodiment herein the network node 110 sends CRS only in PRBs which are used for transmission of data or control information in the subframe in which the network node 110 transmits system information, paging or random access response messages or assumes UE to perform measurements.

The network node 110 may also send CRS only in REs, which are adjacent to REs which are mapped to a common search space of PDCCH. Thereby CRS are sent only in areas where the UE is looking for PDCCH. Thereby the number of subframes where CRS may be sent over the second bandwidth is increased, which further improves performance of the wireless communication network.

The CRS bandwidth may further be adapted in several levels. For LTE, the bandwidth in the cell 130 may e.g. be varied in levels between 1.4 to 20 Mhz. However, depending on the technology used also other bandwidths may be possible.

In a further embodiment a hysteresis function may be applied when changing CRS bandwidth level, thereby avoiding unnecessary switching between the bandwidth modes when the cell 130 is switching from the first to the second bandwidth mode.

In yet another embodiment herein UEs may be moved to the lowest frequency band, which has best coverage, for services which require Voice over IP (VoIP) or other "constant on" type of services, while the CRS may be muted on higher frequency bands. It may beneficial to move Voice over LTE users to the lowest frequency bands, since these are active a lot and need the coverage. This is beneficial for carrier aggregation.

In a further embodiment herein some UEs may be configured with Channel Quality Indicator (CQI) on a Physical Uplink Control CHannel (PUCCH), which may be aligned with the DRX onDuration while some UEs are configured without CQI on PUCCH. Thereby the onDuration periods could be more tightly stacked. Smart selection of UEs that are given PUCCH CQI may be implemented, by e.g. looking at pathloss, in order not to decrease coverage for the system. UEs with a high pathloss may be configured with a CQI on PUCCH, others will not.

In a further embodiment herein dynamic reconfiguration on paging frames and paging occasions may be performed. Thereby reducing the CRS transmissions performed in normal bandwidth mode while maintaining sufficient paging capacity.

In yet a further embodiment a coordination over X2 may be performed between interfering cells. Thereby the interfering cells may inform each other about which subframes are transmitted in the reduced bandwidth mode, which may also be known as blanked subframes, and which are transmitted in the normal bandwidth mode, which may also be known as non-blanked subframes. This may enable the different network nodes to have different outer-loop adjustment values for blanked vs non-blanked subframes which may enhance the results of link adaptation.

In further embodiments herein DL data may be sent to each UE in connected mode with a certain periodicity. This has been shown to increase stability of measurements performed by the UEs, such as RSRP, RSRQ or RSSI. DL data may be sent during a period corresponding to the time of the onDuration of the UE. Tests have shown that a preferred periodicity for the DL data is around 2 seconds, i.e. around every 2 seconds DL data is sent to the UE. The periodically sent DL data may be any DL data. In one embodiment Timing Advance Commands (TAC) is sent as periodical DL data. CRS are sent in the full bandwidth mode during the transmission of the DL data, thereby CRS are provided to the UE during the DL transmission and the following inactivity time, which may also be referred to as the DRX-Inactivity time.

In further embodiments herein, CRS may also be transmitted over the first bandwidth or the full bandwidth mode during UL transmissions, e.g. subframes where UL data is sent.

In further embodiments herein, the periodic DL data transmissions may be aligned between the connected UEs. Since each DL transmission starts a DRX inactivity timer, as defined in 3GPP TS 36.321 v. 9.6.0, CRS will be sent to each UE in full bandwidth mode during the duration of the inactivity period. By aligning the periodic DL data transmissions between the connected UEs, the number of subframes in which full-spectrum CRS need to be transmitted is reduced. This improves the gain when many users are connected, by making sure that full bandwidth CRS transmitted during each UEs DRX-Inactivity timer coincide in time and thus that the number of subframes where CRS may be muted is maximized. Thereby the performance of the cell may further be improved.

In further embodiments herein, the connected UEs may be released and forced to enter IDLE mode after an inactivity timer in the network node, which monitors the UE activity, has lapsed, i.e. when the UE has been inactive for a certain amount of time. In embodiments herein, this inactivity timer may be variable. The inactivity timer may be varied based on the number of connected UEs in a cell. It is beneficial for the method described herein to have as few connected UEs as possible when the method for reducing the CRS bandwidth for connected UEs is active. A threshold of connected UEs in a cell may therefore be defined. When the total number of connected UEs is below the threshold, the duration of the inactivity timer for the connected UEs is reduced compared to the duration of the inactivity timer when the total number of connected UEs in the cell exceeds the threshold. Thereby the connected UEs are released faster, which reduces the number of connected users to a minimum when the method for managing transmission of CRS is active. The reduced inactivity timer may e.g. be around 4 seconds compared to a normal inactivity timer of around 10 seconds.

In further embodiments herein the parameters of the method described herein, such as DRX inactivity timer length, DRX onDuration periodicity and length, which may also be referred to as the onDuration interval, and/or TAC/DL data transmission periodicity may be adapted, which may also be referred to as being tailored or tailoring, according to different types of UEs. An International Mobile Equipment Identity (IMEI) and/or an IMEI Software Version (IMEISV) of the UE may be sent from the core network to the network node and may be used as an identifier to distinguish between different UE types, such as different brands. In a further embodiment, a core network node may identify the brand/type of the UE based on the IMEI or the IMEISV and may send the brand of the UE to the network node. The network node may then adapt the parameters of the method based on the received UE type. In a further embodiment the UE and the network node may establish a proprietary protocol, e.g. on MAC, RLC, PDCP or RRC level, which may be used to identify UE types/brands. Based on the identification of the UE, the UE may request the network node to adapt the parameters above in a way that is beneficial for each UE type. The UE type may be identified by comparing the IMEI and/or the IMEISV of the UE with a database comprising IMEI:s and/or IMEISV:s for different UE types. The database may be stored in the network node or the core network node, depending on the method of identifying the UE.

In yet further embodiments herein, the parameters of the function may be adapted based on the speed of movement of the UE. Indications have shown that UEs may need more or less transmitted CRS:s in the DL depending on the speed of the UE. The speed of the UE may be determined by Doppler estimates performed in the uplink by the network node, such as e.g. an eNodeB, and may be used as input to modify the parameters of the method herein, such as DRX inactivity timer length, DRX onDuration periodicity and length and/or TAC/DL data transmission periodicity. The parameters may be adapted in such that larger Doppler, i.e. higher speed of the UE, would give the UE more opportunities to read CRS, while a low Doppler estimate, i.e. low speed of the UE, would trigger the opposite.

According to a second aspect of embodiments herein, when a second cell is identified, which second cell is not actively serving any UEs, which may also be referred to as serving UEs in IDLE mode the network node applies a reduced CRS bandwidth mode on CRS which are transmitted in the second cell. In the reduced bandwidth mode the bandwidth is reduced in relation to the first bandwidth mode.

In another embodiment, when the network node identifies that a cell is only serving UEs in IDLE mode, the frequency of paging may be reduced while transmitting the subframes of these paging occasions with full CRS bandwidth. In some further embodiments herein some of the surrounding subframes, e.g. one previous or one following subframe may also be transmitted with full CRS bandwidth. To minimize the amount of subframes which are transmitted with full CRS bandwidth there may only be one paging occasion in each radioframe which has paging. This paging occasion may be in subframe 9. Subframe 9 and 0 may be transmitted with full bandwidth only in those radioframes which carry paging, thereby improving idle mode mobility. Furthermore, all subframes comprising SIBs may be transmitted with full CRS bandwidth in order to make allow UEs to hear them. Subframes following or preceding subframe 9 may also be sent with full bandwidth.

Figure 5:
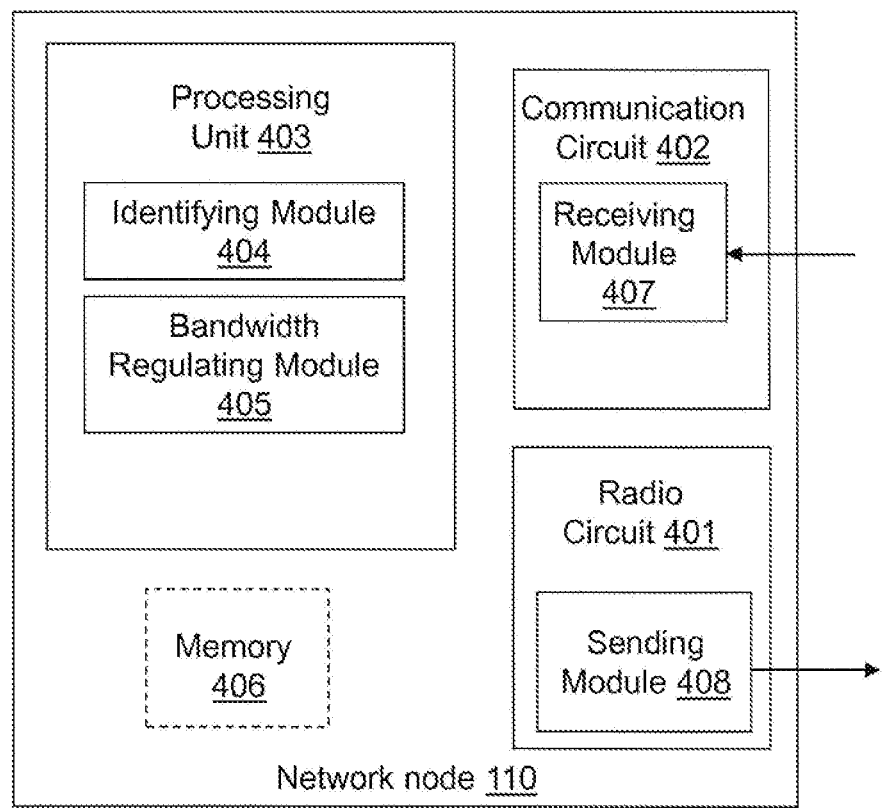
FIG. 5 is a schematic block diagram illustrating embodiments of a network node.

To perform the method actions for managing transmission of CRS described above in relation to FIG. 4, the network node 110 may comprise the following arrangement depicted in FIG. 5. As mentioned above the network node 110 operates one or more cells and is normally configured to transmit the CRS in a first bandwidth mode.

The network node 110 comprises a radio circuitry 401 to communicate with UEs 120, a communication circuitry 402 to communicate with other network nodes and a processing module 403. The communication module 402 may e.g. be an X2 interface.

The network node 110 is configured to, e.g. by means of an identifying module 404 being configured to, identify if a cell 130, 131, 132 is actively serving a set of UEs 121, which may also be referred to as a set of connected UEs, or not. The set of UEs 121 may be unscheduled, by the network node 110, for receiving transmissions from the cell. The network node 110 is further configured to, or comprises a bandwidth regulating module 405 configured to, apply a reduced CRS bandwidth mode of the CRS in the first cell 130 in relation to the first bandwidth mode, when the first cell is identified to actively serve a set of UEs 121.

The network node 110 may further be configured to, e.g. by means of the bandwidth regulating module 405 further being configured to, apply the reduced CRS bandwidth mode on CRS which are sent in any subframe, except in a subframe where the network node 110 transmits system information, paging or random access response messages or assumes UE 120 to perform measurements, such as subframes sent during the onDuration of the UE 120. In this embodiment the network node 110 may further be configured to, e.g. by means of a bandwidth regulating module 405 being further configured to, send CRS over the entire bandwidth of the subframe in the subframe in which the network node 110 transmits system information, paging or random access response messages or assumes UE 120 to perform measurements, such as subframes sent during the onDuration of the UE 120.

In another embodiment herein the network node 110 may further be configured to, e.g. by means of the bandwidth regulating module 405 further being configured to, apply the reduced CRS bandwidth mode on CRS which are sent in any subframe, except in the first OFDM symbol of a subframe in which the network node 110 transmits system information, paging or random access response messages or assumes UE 120 to perform measurements, such as subframes sent during the onDuration of the UE 120. In this embodiment the network node 110 may further be configured to, e.g. by means of the bandwidth regulating module 405 being further configured to, send CRS over the entire bandwidth in the first OFDM symbol of the subframe in which the network node 110 transmits system information, paging or random access response messages or assumes UE 120 to perform measurements, such as subframes sent during the onDuration of the UE 120.

The network node 110 may further be configured to, e.g. by means of the bandwidth regulating module 405 further being configured to, send CRS only in PRBs which are used for transmission in the subframe in which the network node 110 transmits system information, paging or random access response messages or assumes UE 120 to perform measurements, such as subframes sent during the onDuration of the UE 120.

In embodiments herein, the network node 110 may further be configured to, e.g. by means of the bandwidth regulating module 405 further being configured to, send CRS only in REs which are adjacent to REs which are mapped to a common search space of the PDCCH. The common search space comprises the REs used by the network node 110 for sending control information which is common for all UEs 120.

The network node 110 may further be configured to, e.g. by means of a sending module 408 being configured to, send a message to all connected UEs in the cell, which message may comprise a Discontinous Reception (DRX) command. The DRX command may indicate a DRX pattern for the connected UEs, wherein the onDuration of the DRX pattern may be aligned between the UEs 120. The onDuration may further be aligned with a sending of one or more subframes including a System Information Block (SIB). The network node may further be configured to apply a second CRS bandwidth mode on CRS in subframes which are not transmitted in the cell during the on Duration. In the second bandwidth mode the bandwidth is reduced in relation to the first bandwidth mode.

The sending module 408 may be comprised in the radio circuitry 401 within the network node 110.

In order to reduce unnecessary switching between the bandwidth modes, the network node 110 may further be configured to, or may comprise the bandwidth regulating unit 405 further being configured to reduce and/or increase the CRS bandwidth using a hysteresis function. By using a hysteresis function the network node 110 may not switch bandwidth mode immediately when the number of connected UEs 120 changes, but will remain in one bandwidth mode for a certain amount of time after the change of bandwidth mode in the cell has taken place.

In further embodiments herein, the network node 110 may further be configured to, e.g. by means of the bandwidth regulating module 405 further being configured to, send DL data to each UE in connected mode with a certain periodicity. Thereby an increased stability of measurements performed by the UEs, such as RSRP, RSRQ or RSSI may be provided. DL data may be sent during a period corresponding to the on Duration time of the UE. Tests have shown that a preferred periodicity for the DL data is around 2 seconds, i.e. around every 2 seconds DL data is sent to the UE. The periodically sent DL data may be any DL data. In one embodiment Timing Advance Commands (TAC) is sent as periodical DL data. CRS are sent in the full bandwidth mode during the transmission of the DL data, thereby CRS are provided to the UE during the DL transmission and the following inactivity time, which may also be referred to as the DRX-Inactivity time.

In further embodiments herein, the network node 110 may further be configured to, e.g. by means of the bandwidth regulating module 405 further being configured to, align the periodic DL data transmissions between the connected UEs. Since each DL transmission starts a DRX inactivity timer, as defined in 3GPP TS 36.321 v. 9.6.0, CRS will be sent to each UE in full bandwidth mode during the duration of the inactivity period. By aligning the periodic DL data transmissions between the connected UEs, the number of subframes in which full-spectrum CRS need to be transmitted is reduced. This improves the gain when many users are connected, by making sure that full bandwidth CRS transmitted during each UEs DRX-Inactivity timer coincide in time and thus that the number of subframes where CRS may be muted is maximized. Thereby the performance of the cell may further be improved.

In further embodiments herein, the network node 110 may be configured to, e.g. by means of the bandwidth regulating module 405 further being configured to, start an inactivity timer which releases the connected UE and forces the UE to enter IDLE mode after a certain time of inactivity. This inactivity timer may be variable. It is beneficial for the method described herein to have as few connected UEs as possible when the method for reducing the CRS bandwidth for connected UEs is active. A threshold of connected UEs in a cell may therefore be defined. When the total number of connected UEs is below the threshold, the duration of the inactivity timer for the connected UEs is reduced compared to the duration of the inactivity timer when the total number of connected UEs in the cell exceeds the threshold. Thereby the connected UEs are released faster, which reduces the number of connected users to a minimum when the method for managing transmission of CRS is active. The reduced inactivity timer may e.g. be around 4 seconds compared to a normal inactivity timer of around 10 seconds.

In further embodiments herein, the network node 110 may be configured to, e.g. by means of the bandwidth regulating module 405 further being configured to, adapt or tailor the parameters of the method described herein, such as DRX inactivity timer length, DRX on Duration periodicity and length and/or TAC/DL data transmission periodicity according to different types of UEs. The network node 110 may further be configured to, e.g. by means of the identifying module 404 further being configured to, identify/distinguish between different UE types based on an IMEI of the UE, which may be received by the network node 110 from the core network node.

The network node 110 may further be configured to, e.g. by means of the bandwidth regulating module 405 further being configured to adapt the parameters of the method based on the received UE brand/type identified by a core network node based on the IMEI of the UE. The network node 110 may further be configured to, e.g. by means of a bandwidth regulating module 405 further being configured to, establish a proprietary protocol, e.g. on Media Access Control (MAC), Radio Link Control (RLC), Packet Data Convergence Protocol (PDCP) or RRC level, which may be used to identify UE types. Based on the identification of the UE, the network node 110 may further be configured to, e.g. by means of a bandwidth regulating module 405 further being configured to, adapt the parameters above in a way that is beneficial for each UE type.

In yet further embodiments herein, the network node 110 may further be configured to, e.g. by means of the bandwidth regulating module 405 further being configured to, adapt the parameters of the method based on the speed of movement of the UE. Indications have shown that UEs may need more or less transmitted CRS:s in the DL depending on the speed of the UE. The network node 110 may further be configured to, e.g. by means of a bandwidth regulating module 405 further being configured to, perform Doppler estimates in the UL to determine the speed of the UE. The network node 110 may further be configured to, e.g. by means of a bandwidth regulating module 405 further being configured to, modify the parameters of the method herein, such as DRX inactivity timer length, DRX on Duration periodicity and length and/or TAC/DL data transmission periodicity based on Doppler estimates. The parameters may be adapted in such that larger Doppler, i.e. higher speed of the UE 120, would give the UE 120 more opportunities to read CRS, while a low Doppler estimate, i.e. low speed of the UE 120, would trigger the opposite.

In further embodiments, the network node 110 may further be configured to, e.g. by means of a receiving module 407 further being configured to receive the IMEI of the UE 120 or the identified type of UE 120 from the core network node 140. The receiving module may be comprised in the communication circuit 402.

The embodiments herein for managing transmission of CRS may be implemented through one or more processors, such as the processing module 403 in the network node 110 depicted in FIG. 5, together with computer program code for performing the functions and actions of the embodiments herein. The program code mentioned above may also be provided as a computer program product, for instance in the form of a data carrier carrying computer program code for performing the embodiments herein when being loaded into the network node 110. One such carrier may be in the form of a CD ROM disc. It is however feasible with other data carriers such as a memory stick. The computer program code may furthermore be provided as pure program code on a server and downloaded to the network node 110 and/or the core network node.

The network node 110 may further comprise a memory 406 comprising one or more memory units. The memory 406 is arranged to be used to store obtained information, measurements, data, configurations, schedulings, and applications to perform the methods herein when being executed in the network node 110.

FIGS. 6a and 6b disclose a scheduling diagram for DRX and the bandwidth modes according to two embodiments of the method described above. In order to prevent that the reduced bandwidth mode negatively affects, such as destroys, the mobility measurements, such as cell evaluation or best cell evaluation, subframes transmitted during the onDuration of the DRX pattern or subframes where system information is sent are transmitted in the first bandwidth mode, which may also be referred to as full bandwidth mode.

FIG. 6a discloses an embodiment of the method, wherein the CRS is transmitted over the full bandwidth over a total number of thirteen subframes arranged around the subframes of the onDuration. Four of the thirteen subframes are located before the two subframes of each onDuration and seven of the subframes are located after each on Duration. The reduced bandwidth mode is applied on the remaining subframes of the radio frame. Tests have shown that some legacy UEs may not perform measurements as accurately as other UEs and may start to measure shortly before or after the onDuration. By transmitting CRS in the normal bandwidth mode in a plurality of the subframes located around the onDuration, it may be assured that such less accurate UEs are able to measure CRS in order to perform channel estimation, even though the measurement is not performed exactly during the onDuration.

FIG. 6b shows a further embodiment of the method where the number of subframes in which CRS is transmitted over the full bandwidth has been reduced. In this embodiment the normal bandwidth mode is applied on only one subframe preceding the subframe transmitted during the onDuration or the subframe in which system information is sent. Thereby, the number of subframes in which CRS may be sent with the reduced bandwidth is increased which further improves the performance of the network. This embodiment may be used when the UEs 120 connected to the cell provide a high accuracy of measurement.

The network node 110 may adapt the number of subframes in which CRS is transmitted over the full bandwidth, based on the type of UEs 120 connected to the cell. The UE 120 type may be identified based on an identifier, such as an IMEI or a brand/type of the UE 120.

Some of the method actions for managing transmission of CRS described above in relation to FIG. 3, may be performed by a core network node 140. The core network node 140 may comprise the following arrangement depicted in FIG. 7. The core network node 140 may comprise communication circuitry 601 to communicate with other network nodes and a processing module 602. The communication circuitry 601 may e.g. be an X2 interface.

The core network node 140 may be configured to, e.g. by means of an identifying module 603 being configured to, identify/distinguish between different UE brands/types based on an IMEI of the UE. The identifying module 603 may be comprised in the processing unit 602.

The core network node 140 may further be configured to, e.g. by means of a sending module 604 being configured to, send an indication of the brand/type to the network node. The indication may be the IMEI of the UE or the brand/type of the UE identified by the core network node 140. The sending module 604 may be comprised in the communication circuit 601.

Figure 7:
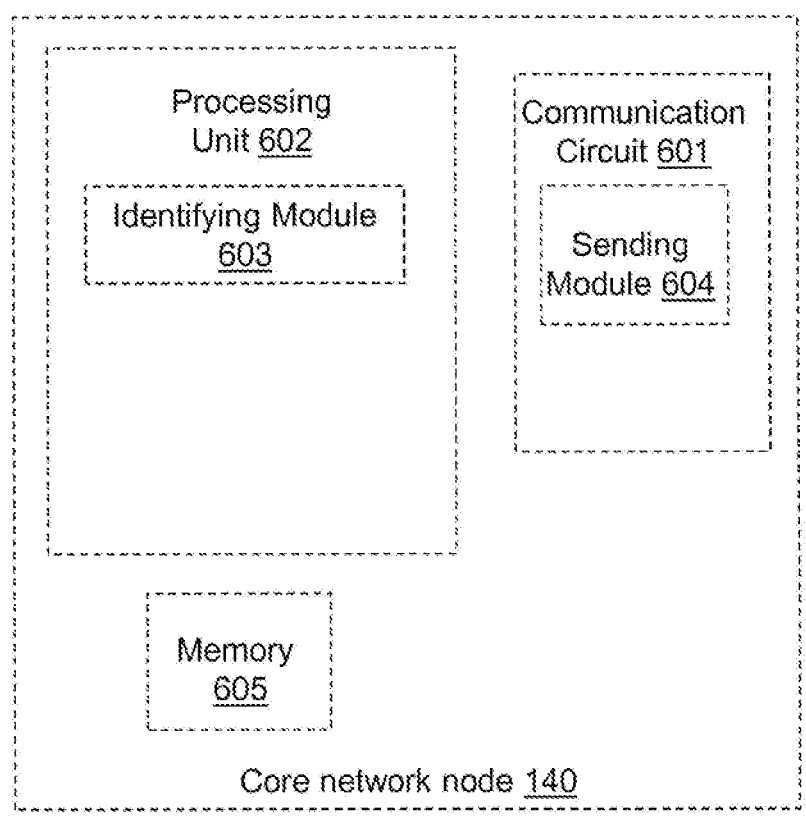
FIG. 7 is a schematic block diagram illustrating embodiments of a core network node.

The embodiments herein for managing transmission of CRS may be implemented through one or more processors, such as the processing module 602 in the core network node depicted in FIG. 7, together with computer program code for performing the functions and actions of the embodiments herein. The program code mentioned above may also be provided as a computer program product, for instance in the form of a data carrier carrying computer program code for performing the embodiments herein when being loaded into the core network node. One such carrier may be in the form of a CD ROM disc. It is however feasible with other data carriers such as a memory stick. The computer program code may furthermore be provided as pure program code on a server and downloaded to the network node 110 and/or the core network node.

The network node 110 may further comprise a memory 406 comprising one or more memory units. The memory 406 is arranged to be used to store obtained information, measurements, data, configurations, schedulings, and applications to perform the methods herein when being executed in the network node 110.

The core network node may further comprise a memory 605 comprising one or more memory units. The memory 605 is arranged to be used to store obtained information, measurements, data, configurations, schedulings, and applications to perform the methods herein when being executed in the core network node.

Those skilled in the art will also appreciate that the identifying module 404, 603 and bandwidth regulating module 405 described above may refer to a combination of analog and digital circuits, and/or one or more processors configured with software and/or firmware, e.g. stored in the memory 406, 605 that when executed by the one or more processors such as the processing unit 403, 602 as described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

When using the word "comprise" or "comprising" it shall be interpreted as non-limiting, i.e. meaning "consist at least of".

When using the word "set" herein, it shall be interpreted as meaning "one or more".

The embodiments herein are not limited to the above described preferred embodiments. Various alternatives, modifications and equivalents may be used. Therefore, the above embodiments should not be taken as limiting the scope of the invention, which is defined by the appending claims.

The invention claimed is:

1. A method performed by a network node, for managing a transmission of one or more Cell-specific Reference Signals (CRS), wherein the network node operates one or more cells and is configured to transmit CRS in a first frequency bandwidth mode, the method comprising:
identifying a first cell out of the one or more cells that is serving a set of unscheduled User Equipment (UEs) wherein in the first cell the network node transmits CRS in subframes in the first frequency bandwidth mode, the subframes being transmitted during an onDuration interval of a Discontinuous Reception (DRX) pattern, in subframes where system information, paging or random access response messages are sent, in subframes where the network node assumes a UE to perform measurements or in subframes where downlink (DL) data is sent;
applying a second frequency bandwidth mode, reduced in relation to the first frequency bandwidth mode, on CRS in subframes which are not transmitted in the first cell during the onDuration interval of the DRX pattern, in subframes where system information, paging or random access response messages are not sent, in subframes where the UE does not perform measurements or in subframes where DL data is not sent; and
transmitting the CRS in subframes of the first cell over the first frequency bandwidth mode and the second frequency bandwidth mode based on whether the subframe is transmitted during the onDuration interval of the DRX pattern, or whether the network node transmits system information, paging or random access response messages in the subframe, or whether the UE performs measurements during the subframe or whether the network sends DL data in the subframe.

2. The method according to claim 1 further comprising: sending a message to the set of unscheduled UEs comprising a DRX command, which DRX command indicates the DRX pattern for the set of unscheduled UEs, wherein the onDuration of the DRX pattern is aligned for UEs comprised in the set of unscheduled UEs, whereby the UEs will have an overlapping onDuration interval.

3. The method according to claim 1, wherein the onDuration interval of the DRX pattern is aligned with a sending of one or more CRS subframes comprising system information.

4. The method according to claim 3, wherein the onDuration of the DRX pattern is aligned with the sending of System Information Block 1 (SIB1).

5. The method according to claim 1, wherein CRS is further sent with a first frequency bandwidth in one or more CRS subframes preceding and/or following CRS subframes sent during the onDuration interval of the DRX pattern or the subframes in which system information is sent.

6. The method according to claim 1, wherein an alignment of the DRX patterns of the UEs is deactivated when a threshold of connected UEs per cell is exceeded.

7. The method according to claim 1, wherein an inactivity timer of the DRX pattern is variable, such that UEs connecting to the cell when a number of connected UEs is below a threshold, have a shorter inactivity timer than UEs connecting to the cell when the number of connected UEs in the cell exceeds the threshold.

8. The method according to claim 1, wherein a length of an activity timer of the DRX pattern and/or a periodicity of the onDuration interval of the DRX pattern and/or a periodicity of DL data is adaptable to different types of UEs, based on an UE identifier.

9. The method according to claim 1, wherein the second frequency bandwidth is reduced to a frequency bandwidth of six central physical resource blocks (PRBs).

10. The method according to claim 1, further comprising sending information about which subframes are applied with a second frequency bandwidth mode to a second network node.

11. A network node configured to manage transmission of Cell Reference Signals (CRS), wherein the network node is configured to operate one or more cells and is configured to transmit CRS in a first frequency bandwidth mode, the network node comprising:
communication circuitry for communicating with User Equipment (UEs); and
processing circuitry configured to:
identify a first cell out of the one or more cells that is serving a set of unscheduled User Equipment (UEs) wherein in the first cell the network node transmits CRS in subframes in the first frequency bandwidth mode, the subframes being transmitted during an onDuration interval of a Discontinuous Reception (DRX) pattern, in subframes where system information, paging or random access response messages are sent, in subframes where the network node assumes a UE to perform measurements or in subframes where downlink (DL) data is sent; and
apply a second frequency bandwidth mode, reduced in relation to the first frequency bandwidth mode, on CRS in subframes which are not transmitted in the first cell during the onDuration interval of the DRX pattern, in subframes where system information, paging or random access response messages are not sent, in subframes where the UE does not perform measurements or in subframes where DL data is not sent; and
transmit the CRS in subframes of the first cell over the first frequency bandwidth mode and the second frequency bandwidth mode based on whether the subframe is transmitted during the onDuration interval of the DRX pattern, or whether the network node transmits system information, paging or random access response messages in the subframe, or whether the UE performs measurements during the subframe or whether the network sends DL data in the subframe.

12. The network node according to claim 11, wherein the network node is further configured to:
send a message to the set of unscheduled UEs comprising a DRX command, which DRX command indicates the DRX pattern for the set of unscheduled UEs, wherein the onDuration of the DRX pattern is aligned for UEs comprised in the set of unscheduled UEs, whereby the UEs will have an overlapping onDuration interval.

13. A non-transitory computer readable medium containing program instructions that, when executed by at least one processor, causes the at least one processor to:
identify a first cell out of the one or more cells that is serving a set of unscheduled User Equipment (UEs), wherein in the first cell the network node transmits CRS in subframes in the first frequency bandwidth mode, the subframes being transmitted during an onDuration interval of a Discontinuous Reception (DRX) pattern, in subframes where system information, paging or random access response messages are sent, in subframes where the network node assumes a UE to perform measurements or in subframes where downlink (DL) data is sent; and apply a second frequency bandwidth mode, reduced in relation to the first frequency bandwidth mode, on CRS in subframes which are not transmitted in the first cell during the onDuration interval of the DRX pattern, in subframes where system information, paging or random access response messages are not sent, in subframes where the UE does not perform measurements or in subframes where DL data is not sent; and transmit the CRS in subframes of the first cell over the first frequency bandwidth mode and the second frequency bandwidth mode based on whether the subframe is transmitted during the onDuration interval of the DRX pattern, or whether the network node transmits system information, paging or random access response messages in the subframe, or whether the UE performs measurements during the subframe or whether the network sends DL data in the subframe.

* * * * *